United States Patent [19]

Kell

[11] 4,096,763
[45] Jun. 27, 1978

[54] HYPOCYCLOIDAL REDUCTION GEARING

[75] Inventor: Nathaniel B. Kell, Indianapolis, Ind.

[73] Assignee: General Motors Corporation, Detroit, Mich.

[21] Appl. No.: 753,261

[22] Filed: Dec. 22, 1976

[51] Int. Cl.² ............................................. F16H 21/14
[52] U.S. Cl. ........................................ 74/69; 74/773; 74/801
[58] Field of Search ................. 74/52, 69, 773, 801, 74/804, 805, 750 R, 789, 394

[56] References Cited

U.S. PATENT DOCUMENTS

| 611,779 | 10/1898 | Fefel | 74/69 |
|---|---|---|---|
| 1,172,936 | 2/1916 | Burn | 74/69 |

*Primary Examiner*—Samuel Scott
*Assistant Examiner*—Frank H. McKenzie, Jr.

*Attorney, Agent, or Firm*—Donald F. Scherer

[57] ABSTRACT

A gear reduction mechanism wherein a modification of the hypocycloidal principle is used. The planet gear of the hypocycloidal arrangement has at least one-half tooth more or less teeth than one-half the number of teeth on the ring gear. Either the ring gear or a pin reaction plate is permitted to rotate while the other is stationary. The reaction pins disposed on the planet gear travel in straight lines in slots formed in the reaction plate. When the reaction plate is stationary, the ring gear must rotate a very small amount during one complete rotation of the planet carrier to compensate for the tooth difference between the ring and planet gears. When the ring gear is held stationary, the reaction plate is forced to rotate to compensate for the tooth difference.

4 Claims, 4 Drawing Figures

HYPOCYCLOIDAL REDUCTION GEARING

This invention relates to reduction gear mechanisms and more particularly to reduction gearing wherein very high gear reduction ratio is accomplished.

Conventional hypocycloidal arrangements are utilized to convert rotary motion into linear motion. These arrangements employ a planet gear rotatably mounted on a planet carrier. The planet gear meshes with a stationary ring gear. The number of teeth on the ring is equal to twice the number of teeth on the planet gear. An output pin is secured to the planet gear at a position perpendicular to and aligned with the pitch diameter thereof. The planet carrier is rotated such that the planet gear rotates on its own axis and orbits within the ring gear. When the planet carrier is rotated through one-half revolution, the planet gear has completed one revolution and the pin travels in a straight line along the diameter of the ring gear from one point on the pitch diameter thereof to a diametrically opposed point. Upon completion of one rotation of the planet carrier the pin is returned to its starting position and has traversed the straight line along the diameter of the ring gear twice.

This hypocycloid principle is modified in the present invention by utilizing the plate member which has linear slots formed therein. Preferably two slots are formed in the plate, which slots intersect at right angles at the center of the plate which is aligned with the center of the ring gear. The planet gear has two pins formed thereon which are aligned in the slots and therefore have to travel a straight line as the planet gear orbits within the ring gear. The planet gear is formed with at least one-half tooth more or less than the half the number of teeth on the ring gear. As the planet gear orbits within the ring gear the pins follow a straight line formed by the slots such that the ring gear is forced to rotate a slight amount due to the tooth differential. If the planet gear has one-half or more teeth than one-half the number of teeth in the ring gear the ring gear will rotate in the same direction as the input member. If the planet gear has at least one-half tooth less than one-half the number of teeth on the ring gear the ring gear will rotate in the direction opposite to the input.

The hypocycloid arrangement may also be modified by permitting the slotted plate to rotate while maintaining the ring gear stationary. In this situation the slotted plate is forced to rotate a slight amount due to the tooth difference as explained above. However if the ring gear is stationary the slotted plate will rotate in the same direction as the input when the planet gear has at least one-half tooth more than one-half the number teeth on the ring gear, and in a direction opposite the input if the planet gear has at least one-half tooth less than one-half the number of teeth on the ring gear.

This arrangement will permit very high gear reductions from the input member to the output member. Such gear reductions are useful in machine tools, winches and other types of equipment where it is desirable to have a very slow output rotation which requires significant torque while having a high speed low torque input power source.

It is therefore an object of this invention to provide an improved high reduction gearing mechanism.

A further object of this invention is to provide an improved gear reduction mechanism utilizing a modified hypocycloidal mechanism.

Another object of this invention is to provide an improved high reduction gear mechanism in a modified hypocycloid type arrangement in which the planet gear has at least one-half tooth more or less than one-half the number of teeth on the ring gear and wherein the ring gear or a reaction plate is stationary while the other is drivingly connected to an output shaft.

It is also an object of this invention to provide an improved gear reduction mechanism having an input carrier on which is rotatably supported a planet gear meshing with a ring gear on which one-half the number of teeth thereof is one-half tooth more or less than the number of teeth on the planet gear, and wherein the planet gear has reaction members secured thereto which are aligned in linear slots formed in a reaction plate and wherein either the ring gear or reaction plate is held stationary while the other is drivingly connected to the output shaft.

These and other objects and advantages of this invention will be more apparent from the following description and drawings in which.

Figure 1:
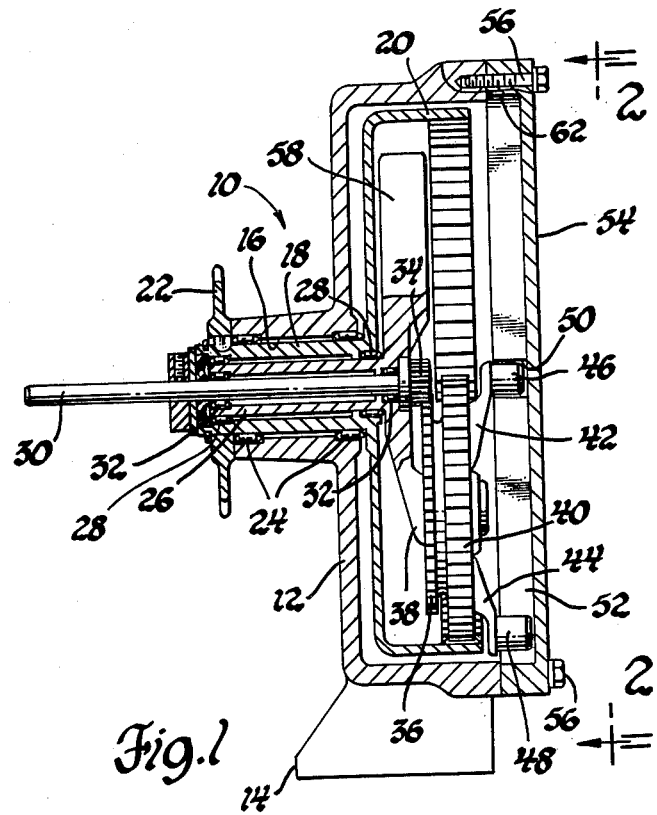
FIG. 1 is a cross sectional elevational view of a gearing mechanism incorporating the present invention.
Figure 2:
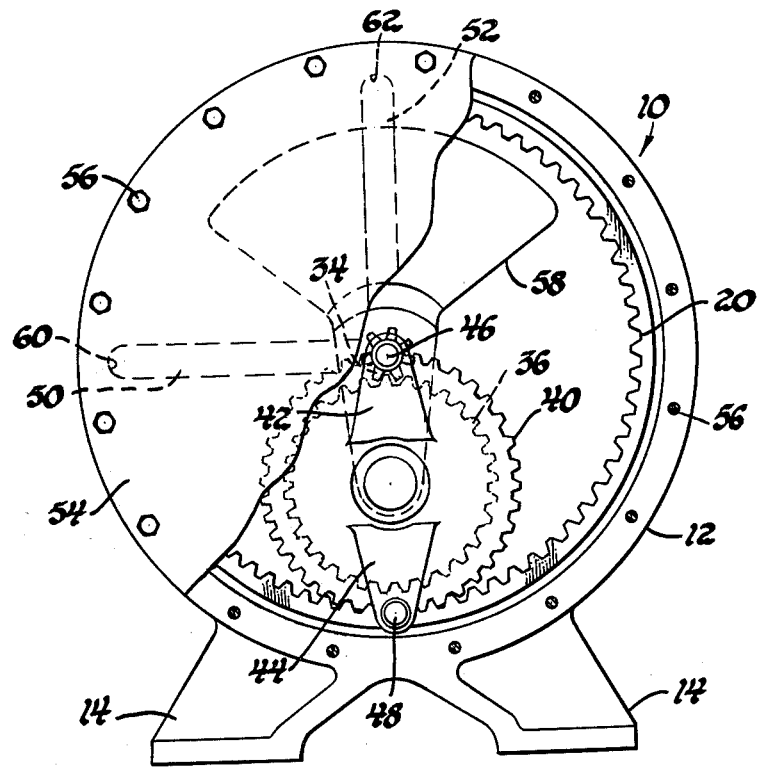
FIG. 2 is an end view, partly in section, taken along the line 2—2 of FIG. 1.

Referring to the drawings and particularly FIGS. 1 and 2 there is shown therein gear reduction mechanism 10 having a housing 12 on which are formed mounting pads 14 which are adapted to secure the housing 12 in a fixed position. The housing 12 has an annular opening 16 in which is rotatably supported a shaft 18 on which is formed a ring gear 20 and a sprocket 22. The shaft 18 is supported on a pair of roller bearings 24 within the housing 12. A planet carrier 26 is rotatably supported in the shaft 18 on a pair of roller bearings 28, and an input shaft 30 is rotatably supported in the carrier 26 on a pair of roller bearings 32. The input shaft 30 has formed thereon a small gear 34 which meshes with a larger gear 36 which is rotatably mounted on an arm 38 formed on the carrier 26. Integral with the gear 36 or otherwise secured thereto is a planet or pinion gear 40.

The planet gear 40 meshes with the ring gear 20 and has formed thereon a pair of radially extending arms 42 and 44. The radial extending arms terminate in axially extending pins 46 and 48 respectively. The pin 46 is aligned in a slot 50 and the pin 48 is aligned in a slot 52. These slots 50 and 52 are formed in a cover member or reaction plate 54 which is secured to the housing 12 by a plurality of threaded fasteners 56. Opposite the arm 38 of carrier 26 is formed a counterbalance member 58 which compensates for the mass of the gears 36 and 40 and arm 38 during rotation of the carrier 26. The planet gear 40 has at least one-half tooth more or less than one-half the number of teeth on the ring gear 20. If gear 40 has at least one-half tooth more than one-half the number of teeth on ring gear 20, the pitch diameter of gear 40 is greater than one-half the pitch diameter of gear 20. If gear 40 has at least one-half tooth less than one-half the number of teeth on gear 20, the pitch diameter of gear 40 is less than one-half the pitch diameter of gear 20. For example, if the ring gear 20 has 99 teeth the planet gear 40 could have 49 or less teeth or 50 or more teeth. If the ring gear 20 has 100 teeth the planet gear 40 can have 49 or less teeth or 51 or more teeth, however in this latter situation the planet gear 40 could not have 50 teeth.

In the position shown in FIG. 1 the central axis of pin 46 is aligned with the axis of input shaft 30 and with the central axis of ring gear 20. The distance of the central axis of pins 46 and 48 from the central axis of planet gear 40 is equal to one-half the diameter of gear 34 plus one-half the diameter of gear 36, and is not therefore coincidental with the pitch diameter of planet pinion 40 as is customary with a conventional hypocycloidal arrangement.

When the input shaft 30 is rotated, the gear 34 drives the gear 36 and therefore the planet gear 40 which is integral therewith. During the initial amount of rotation the pin 48 acts as a reaction member against the slot 52 thereby enforcing rotation of the carrier 38 such that the gear 40 orbits within the ring gear 20. Since the pins 48 and 46 must travel in their respective slots the pin 46 moves towards the end 60 of slot 50 while the pin 48 moves toward the intersection of the two slots. After the pin 46 is moved from the central position shown, this pin also provides a reaction point for the gear 40 such that the reaction is then taken at two points. This sharing of reaction continues until the carrier arm 38 has completed a quarter revolution at which time the pin 46 is located at end 60 of slot 50 and pin 48 is located at the intersection of the slots 50 and 52. At this time the entire reaction is taken by pin 46. However, on continued rotation of the carrier 26, the pin 48 moves toward the end 62 of slot 52 and as it passes through the intersection point again assumes part of the reaction function within the gear mechanism.

When the input shaft 30, and therefore gear 34, is rotated counterclockwise, the gear 36 and planet gear 40 will be rotated clockwise. The pin 48 reacts against the slot 52 such that the carrier 26 will rotate in a counterclockwise direction. During the first quarter of the rotation of carrier 26 the pin 46 will move toward end 60 of slot 50 and pin 48 will move toward the intersection of the two slots. Upon continued rotation of carrier 26, the pin 48 will move toward end 62 of slot 52 and pin 46 will move back to the center position shown. During the following one quarter rotation of the carrier 26, the pin 46 will move in slot 50 to the right as viewed in FIG. 2, from the center position, and pin 48 will move from end 62 to the center of the slots. During the last quarter revolution the pin 48 will move in slot 52 to the position shown in FIGS. 1 and 2 and the pin 46 will return to the center position. When either of the pins 46 or 48 is in the center position it cannot provide a reaction such that all of the reaction in the system is taken by a single pin at that particular time. However when the pins are aligned in their slots and displaced from the central position both members carry reaction forces within the system.

If the ring gear 20 had exactly twice the number of teeth of planet pinion 40, the ring gear 20 would remain stationary during one complete revolution of the carrier 26. However, since there is a tooth differential as explained above, the ring gear 20 will be rotated an amount equal to the difference between twice the teeth on planet pinion 40 and the teeth on ring gear 20. For example if the planet gear 40 has 50 teeth and the ring gear 20 has 99 teeth, the planet gear 40 will present 100 teeth to the ring gear during one complete rotation of the carrier 26. Since the ring gear 20 has only 99 teeth, the ring gear must advance one tooth during this one rotation of the carrier 26. The reduction ratio can be explained using a specific example. Assume gear 34 is a 20 pitch 10 tooth gear, gear 36 is a 20 pitch 90 tooth gear, gear 40 is a 10 pitch 49 tooth gear, and gear 20 is a 10 pitch 99 tooth gear, the reduction will be as follows: the gear 34 rotates four and three-quarters revolutions; gear 36 rotates one-half revolution about its center, plus one-quarter revolution due to its orbit caused by gear 40 rolling in mesh with gear 20 while guided by rollers 46 and 48 and slots 50 and 52. At the same time, gear 20 is advanced 1/396 of a revolution this is equal to one-quarter tooth. At this point the ratio is 4.75 divided by 1/396 which is equal to an overall reduction of 1881:1. Thus it is seen that very high reduction ratios can be obtained with this mechanism. If with the gearing described in the above example the input shaft is rotated at 1881 revolutions per minute the output sprocket 22 will be rotated at 1 revolution per minute. The rating for FIG. 1 can also be calculated from the following formula where A=no. of teeth on gear 34, B=no. of teeth on gear 36. C=no. of teeth on gear 40 and D=no. of teeth on gear 20:

$$\text{Ratio} = (1 + (2B/A)(D/D-2c)) : 1$$

Figure 3:
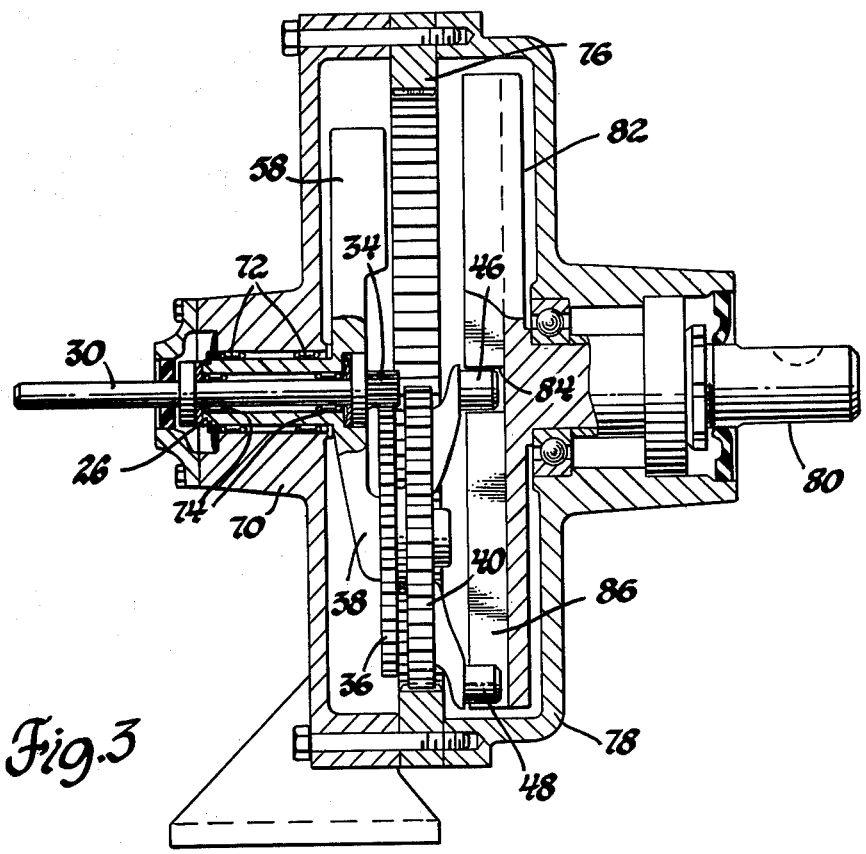
FIG. 3 is a cross sectional elevation view of a modification of the gear mechanism incorporating the present invention.

In the structure shown in FIGS. 1 and 2 the output member of the gear reduction arrangement is the ring gear 20. In the modifications shown in FIGS. 3 and 4 the output member is an output plate and the ring gear is a stationary or reaction member. Referring to FIG. 3 there is shown a housing 70 in which is rotatably supported on needle bearings 72 the planet carrier 26 which is essentially of the same construction shown in FIG. 1. The input shaft 30 is rotatably supported in the carrier 26 by needle bearings 74 and has formed thereon a gear 34. The gear 34, gear 36, gear 40, pins 46 and 48 and carrier 26 are essentially the same construction described above in FIG. 1. A ring gear 76 is secured between the housing 70 and an end cap 78 in which is rotatably supported an output shaft 80 on which is formed an output plate 82. The plate 82 has formed therein intersecting slots 84 and 86 in which are disposed the pins 46 and 48 respectively. The operation of the mechanism shown in FIG. 3 is essentially the same as that described above for FIG. 1 except that the output shaft 80 will rotate in a direction opposite to the input shaft 30 when the pitch diameter of gear 40 is smaller than one-half the pitch diameter of gear 76, and in the same direction as input shaft 30 when the gear 40 is larger than one-half the pitch diameter of gear 76. The ratio formula is similar to that for FIG. 1, with D=no. of teeth on gear 76.

$$\text{Ratio} = (1 + (2B/A)(D/2C-D)) : 1$$

Figure 4:
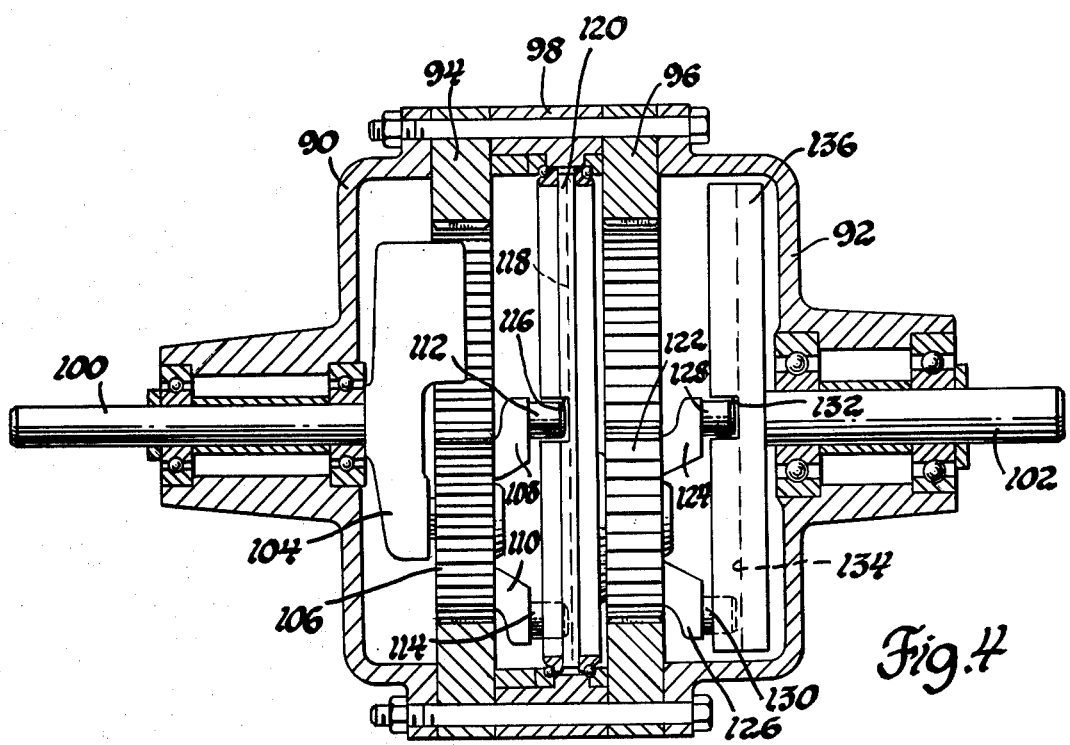
FIG. 4 is a cross sectional elevational view of a further modification.

The modification shown in FIG. 4 includes two stationary housing members 90 and 92 between which are secured ring gears 94 and 96 and a sleeve portion or hub 98. An input shaft 100 is rotatably supported in the member 90 and an output shaft 102 is rotatably supported in the member 92. The input shaft 100 has secured thereto a carrier member 104 on which is rotatably supported a planet pinion 106 which has radially extending arms 108 and 110 in a manner similar to that described above for gear 40 in FIGS. 1 and 2. The radial extending arms 108 and 110 have formed thereon pins 112 and 114 respectively which are aligned in slots 116 and 118, respectively, which are formed in a plate member 120, which is rotatably supported in the sleeve member 98. The plate member 120 also provides the function of a carrier for a planet gear 122 which is similar in construction to planet gear 106 and therefore includes radial arms 124 and 126 which have formed thereon pins 128 and 130 respectively. These pins 128 and 130 are aligned in slots 132, 134 formed in an output plate 136 which is secured to the output shaft 102.

The reduction provided by the mechanism shown in FIG. 4 is similar to that obtained in the mechanism shown in FIG. 3 above, that is if the pitch diameter of gear 106 is larger than one-half the pitch diameter of gear 94 the plate 120 will rotate in the same direction as input shaft 20. If the pitch diameter of planet gear 122 is larger than one-half the pitch diameter of gear 96, the plate 136 and therefore output shaft 102 will rotate in the same direction as plate 120. If the pitch diameter of gear 106 is smaller than one-half the pitch diameter of gear 94, the plate 120 will rotate in a direction opposite to the rotation of input shaft 100. If the pitch diameter of gear 122 is less than one-half the pitch diameter of gear 96, the plate 136 and output shaft 102 will rotate in a direction opposite to plate 120. It can be seen therefore that a variety of pitch diameter combinations of gears 106 and gear 94 and of gear 122 and gear 96 can provide a number of variations in the direction of rotation between the output shaft 102 when compared to the input shaft 100. It will be noted in FIG. 4 that input gearing similar to 34 and gear 36 are not included with this arrangement however they could be included if desired. In fact it is possible by removing the end cap 78 of FIG. 3 and replacing it with a member such as sleeve 98 and a second planetary gear mechanism as shown in FIG. 4 a compound reduction similar to that shown in FIG. 4 will be obtained. It should also be evident from viewing FIG. 4 that a number of like planet gearing arrangements could be included between the input shaft 100 and output shaft 102 to provide the input to output gear reduction desired.

The ratio for FIG. 4 can be calculated as follows:

A = no. of teeth on gear 94
B = no. of teeth on gear 106
C = no. of teeth on gear 96
D = no. of teeth on gear 122

Ratio = (A/2B−A) (C/2D−C) : 1

Obviously many modifications and variations are possible in light of the above teaching. It is, therefore, to be understood that within the scope of the appended claims the invention may be practiced otherwise than is specifically described.

What is claimed is:

1. A speed reducing mechanism comprising; a housing; an output shaft rotatably supported in said housing; an input shaft rotatably supported in said housing; a gear carrier rotatably supported in said housing and being drivingly connected to said input shaft; an internally toothed gear; a pinion gear rotatably mounted on said gear carrier and meshing with said internally toothed gear and having at least one-half tooth more or less than one-half the number of teeth on said internally toothed gear; a plate member having first and second slots formed thereon in intersecting relation to each other with said intersection occurring at the central axis of said internally toothed gear; and first and second reaction means formed on said pinion gear and being disposed in said first and second slots; one of said internally toothed gear or said plate member being secured to said housing and the other being drivingly connected to said output shaft.

2. A speed reducing mechanism comprising; a housing including a cover; an output shaft rotatably supported in said housing; an input shaft rotatably supported in said housing; a gear carrier rotatably supported in said housing; an externally toothed input gear secured to said input shaft; an internally toothed output gear secured to said output shaft; a first pinion gear rotatably mounted on said gear carrier and meshing with said input gear; a second pinion gear secured to said first pinion gear and also rotatably mounted on said gear carrier, said second pinion gear meshing with said output gear and having at least one-half tooth more or less than one-half the number of teeth on said output gear; a reaction plate secured to said housing and having first and second reaction slots formed thereon in intersecting relation to each other with said intersection occurring at the central axis of said output gear; first and second reaction rollers disposed on said second pinion gear and being disposed in said first and second reaction slots respectively.

3. A speed reducing mechanism comprising; a housing including a cover; an output shaft rotatably supported in said housing; an input shaft rotatably supported in said housing; a gear carrier rotatably supported in said housing; an input gear secured to said input shaft; a ring gear secured to said housing; a first pinion gear rotatably mounted on said gear carrier and meshing with said input gear; a second pinion gear secured to said first pinion gear and also rotatably mounted on said gear carrier, said second pinion gear meshing with said ring gear and having at least one-half tooth more or less than one-half the number of teeth on said ring gear; a plate member drivingly connected to said output shaft and having first and second slots formed thereon in intersecting relation to each other with said intersection occurring at the central axis of said ring gear; first and second reaction means disposed on said second pinion gear and being disposed in said first and second slots respectively.

4. A speed reducing mechanism comprising; a housing; an output shaft rotatably supported in said housing; an input shaft rotatably supported in said housing; a first gear carrier rotatably supported in said housing and being drivingly connected to said input shaft; a first ring gear secured in said housing; a first pinion gear rotatably mounted on said first gear carrier and meshing with said first ring gear and having at least one-half tooth more or less than one-half the number of teeth on said first ring gear; a second gear carrier rotatably supported in said housing and having first and second slots formed thereon in intersecting relation to each other with said intersection occurring at the central axis of said first ring gear; first and second reaction means disposed on said first pinion gear and being disposed in said first and second slots respectively; a second ring gear secured in said housing; a second pinion gear rotatably mounted on said second gear carrier in meshing relation with said second ring gear; a plate member drivingly connected to said output shaft and having first and second slots formed thereon in intersecting relation to each other; and third and fourth reaction means formed on said second pinion gear and being disposed in said first and second slots of said plate member respectively.

* * * * *